United States Patent
Harrow

(10) Patent No.: US 9,949,076 B2
(45) Date of Patent: Apr. 17, 2018

(54) NETWORK ELEMENTS, WIRELESS COMMUNICATION SYSTEM AND METHODS THEREFOR

(71) Applicant: ip.access Limited, Cambridge (GB)

(72) Inventor: James Edward Brereton Harrow, Cambridge (GB)

(73) Assignee: ip.access Limited, Cambridge (GB)

( * ) Notice: Subject to any disclaimer, the term of this patent is extended or adjusted under 35 U.S.C. 154(b) by 0 days.

(21) Appl. No.: 15/311,604

(22) PCT Filed: Apr. 16, 2015

(86) PCT No.: PCT/EP2015/058223
§ 371 (c)(1),
(2) Date: Nov. 16, 2016

(87) PCT Pub. No.: WO2015/176878
PCT Pub. Date: Nov. 26, 2015

(65) Prior Publication Data
US 2017/0094461 A1 Mar. 30, 2017

(30) Foreign Application Priority Data
May 23, 2014 (GB) .................................. 1409268.8

(51) Int. Cl.
*H04W 4/02* (2009.01)
*H04W 68/02* (2009.01)
(Continued)

(52) U.S. Cl.
CPC ............. *H04W 4/021* (2013.01); *H04L 67/24* (2013.01); *H04W 4/20* (2013.01); *H04W 8/02* (2013.01); *H04W 64/00* (2013.01); *H04W 68/02* (2013.01)

(58) Field of Classification Search
CPC ... H04W 48/16; H04W 68/02; H04W 68/005; H04W 16/32; H04W 84/045; H04W 4/02; H04W 16/16; H04W 4/04
See application file for complete search history.

(56) References Cited

U.S. PATENT DOCUMENTS

| | | | |
|---|---|---|---|
| 2011/0092211 A1 | 4/2011 | Osborn | |
| 2011/0294506 A1* | 12/2011 | Claussen | ................. H04W 8/10 455/435.1 |
| 2012/0088496 A1* | 4/2012 | Lee | ........................ H04W 8/26 455/422.1 |

FOREIGN PATENT DOCUMENTS

| | | |
|---|---|---|
| EP | 2194739 A1 | 6/2010 |
| EP | 2451219 A1 | 5/2012 |

(Continued)

*Primary Examiner* — Nam Huynh
(74) *Attorney, Agent, or Firm* — Optimus Patents US, LLC

(57) ABSTRACT

"Spoof" paging messages including the TMSI of a user equipment (129) known to be a vicinity are transmitted with a relatively high periodicity in an indoor cluster of presence nodes (113-121) and the node which receives the paging response from the user equipment is recorded, thus giving an indication of presence (and location) with a fine granularity. An additional presence node (125) having a different LAC from the macrolayer (123) is located at the entrance to the indoor cluster so that the TMSI and IMSI of the user equipment can be obtained. The invention can advantageously be employed in a retail store where a fine granularity in tracking subscriber movements around the store is desired. To conserve the user equipment's battery life, spoof paging messages are not sent to those user equipments which enter the vicinity on a regular basis, such as employees of the retail store.

20 Claims, 4 Drawing Sheets

(51) Int. Cl.
*H04W 8/02* (2009.01)
*H04L 29/08* (2006.01)
*H04W 4/20* (2009.01)
*H04W 64/00* (2009.01)

(56) References Cited

FOREIGN PATENT DOCUMENTS

GB 2507119 A1 4/2014
GB 2507301 A1 4/2014

* cited by examiner

NETWORK ELEMENTS, WIRELESS COMMUNICATION SYSTEM AND METHODS THEREFOR

FIELD OF THE INVENTION

The field of this invention relates to network elements, a wireless communication system and methods for operating a cellular communication system and has particular applicability to providing a location presence service in such a system.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so voice services are provided by Voice-over-LTE (VoLTE—a VoIP technique) or, via Circuit Switched Fallback (CSFB) by a 2G or 3G Radio Access Network (RAN) and circuit switched (CS) domain network. User Equipment(UE) can access a CS domain core network through a 2G/3G RAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN.

Some User Equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (APs) with the term Home Node B (HNB, specifically for 3G) or Evolved Home Node B (HeNB, specifically for LTE) defined by 3GPP to identify femtocell Access Points. Each small-cell is supported by a single Access Point. These small cells are intended to augment the wide area macro network and support communications to multiple User Equipment devices in specific environments, for example, indoor or enterprise. Such small cells are intended to be able to be deployed "underneath" a macrocell (in a multi-layer structure, for example) in order to support communications to UEs in a restricted area such as a shopping mall, for example. An additional benefit of small cells is that they can offload traffic from the macro network, thereby freeing up valuable macro network resources). One or more Access Points are linked to a Core Network through an Access Controller. An Access Controller which links one or more HNB's to the Core Network is known as a Home Node B Gateway (HNB-GW). An HNB provides a radio access network connectivity to a user equipment (UE) using the so-called Iuh interface to a HNB-GW.

Although there are no standard criteria for the functional components of an AP, an example of a typical AP for use within a 3GPP 3G system may comprise Node-B functionality and some aspects of Radio Network Controller (RNC) functionality as specified in 3GPP TS 25.467.

A current industry model is to implement a GSMA one API on one of three places: viz. on the User Equipment (for handset applications) or on the small cell (for local applications) or on the application Gateway (for external third-party access). The GSMA one API is an application programming interface which has been developed by the GSM (Global System for Mobile Communications) Association. It is intended to be a web service interface. An application developed with one API can obtain information across network operators that support it. It is intended for operation on servers and mobile devices and the first API's to be implemented will be for messaging and location functions. Specifically, version 1 requires "location presence" capability and the ability to send and receive short message services (SMS) and multimedia messaging services (MMS) through the application Gateway using the GSMA one API.

"Presence" services in general permit an individual and equipment which he/she uses for communication to share information on the state of the individual and that equipment. Such information can include whether the individual and his communication equipment are currently able to communicate with others or are engaged on a video call, for example. "Presence" can also include information relating to the location of a user's communication equipment. A "presence server" may be provided in such instances for, on detection that a particular UE has entered a particular location, enabling applications that subscribe to a "presence" service to take some form of action. For example, location information can be very useful to retailers and advertisers who may wish to communicate with shoppers who are known to be in a certain location at a certain time, a shopping mall for example.

Some current Location Presence services are based on the use of a localised Identity Request sent by an Access Point to a UE to obtain its IMSI International Mobile Subscriber Identifier). This was originally proposed to support a form of access control. If the Access Point is prepared to offer normal telecommunications services, then the UE is allowed to register on the small cell. Alternatively, the IMSI may be captured from the so-called "Common ID" sent by the Core network. In each case an Access Point must have a different LAC/RAC from the surrounding coverage (ie. other small cells or overlapping macrocell) in order to prompt a Registration attempt when camping on. A registration attempt may be used to prompt a location presence trigger, by, on receipt of a request for registration, notifying a location presence server of the presence of the wireless communication unit and of the identity of the wireless communication unit. However, in the 3GPP standard, a UE is deliberately restricted from selecting a different LAC too frequently. Six minutes is a typical minimum time interval. This is because the UE may be in a border area between two LACs and may be regularly reselecting cells with different LACs (due to signal strength fluctuations). While this measure serves to save UE battery life and reduce network signalling, it has a disadvantage for presence applications which are based on LAC reselection. Some retail analytics applications for presence require fast-grained accuracy (e.g. 10 second intervals) such as in an environment with multiple low-powered Presence Cells (eg. one at the end of every aisle in a supermarket).

SUMMARY OF THE INVENTION

According to a first aspect of the invention, there is provided a method for providing a location presence service in a cellular communication system comprising a plurality of neighbouring small cells including a presence cell and a cluster of cells, the method comprising: assigning an area code to the presence cell which is different from an area code assigned to a neighbouring macrocell; assigning an area code to each cell in the cluster of cells which is the same as the area code of the macrocell; receiving at the presence cell, from a wireless communication unit, a registration request and an identity of the wireless communication unit; rejecting the request for registration; transmitting, periodically, in each cell included in the cluster of cells, a first paging message containing an identity of the wireless communication unit; receiving from the wireless communication at a first cell included in the cluster of cells, a first paging message acknowledgement; and in response, generating a first presence message wherein the first presence message includes the identity of the wireless communication unit and an estimated location of the wireless communication unit.

Hence, by periodically transmitting "spoof" paging messages to user equipment(s) in an area covered by a cluster of small cells, a location presence service with a fine granularity can be provided If the periodicity of the "spoof" paging messages is set to be 10-20 seconds say, the invention may find application in a retail store, for example, where a subscriber's movements can be tracked as he/she moves throughout the store.

According to a second aspect of the invention there is provided apparatus for providing a location presence service in a cellular communication system comprising a plurality of neighbouring small cells including a presence cell and a cluster of cells wherein the presence cell has an area code which is different from that of a neighbouring macrocell and the cluster of cells has an area code which is the same as that of the macrocell, the apparatus comprising a presence controller: arranged to receive from the presence cell an identity of a wireless communication unit requesting registration with the presence cell, to generate a first paging message containing an identity of the wireless communication unit and send the first paging message to each cell in the cluster of cells with an instruction to periodically broadcast the first paging message, to receive via a first cell included in the cluster of cells, a first paging message acknowledgement sent by the wireless communication unit; and in response, to generate a first presence message wherein the first presence message includes the identity of the wireless communication unit and an estimated location of the wireless communication unit.

Advantageously, the presence cell and cells comprising the cluster of cells can act independently of the core network to which the macrocell may be attached. Also, advantageously, the functionality of the presence cell and cells comprising the cluster can be realised using conventional Access Point/small cell technology. Also, advantageously, no modifications to a standard wireless communication unit (or UE) need to be made in order to put the invention into practice.

In one embodiment, subsequent to receiving, at the first cell, the first paging message acknowledgement, the method also includes transmitting an instruction to the wireless communication unit to return to an idle mode. Such an instruction may comprise a standard RRC (radio resource control) connection release.

In one arrangement, neither the presence cell nor the cluster of cells is connected to a core network and If one at one of the cells in the cluster of cells should receive a request from the wireless communication unit for access to a core network; it may, in response redirect the wireless communication unit to the macrocell. Further, the method may include detecting (in a receiver associated with the presence controller, for example) a second (genuine) paging message for the wireless communication unit broadcast by the macrocell and then broadcasting the detected second paging message in each cell comprising the cluster of cells; and receiving at one of the cells in the cluster of cells a second acknowledgement message from the wireless communication unit; and generating and transmitting an instruction for redirecting the wireless communication unit to the macrocell. This permits the wireless communication unit to receive an incoming call, for example.

An instruction for redirecting a wireless communication unit to the macrocell may comprise a standard RRC (radio resource control) message.

The registration request may comprise a Location Update request.

The area code may be a location area code (LAC) and in one embodiment, the area code of the presence cell may be changed periodicaly. This has the advantage of prompting the wireless communication unit to re-register with the presence cell since the wireless communication unit may remember area codes of those cells which it has previously been unable to access and otherwise ignore it.

In a further embodiment an instruction may be transmitted from one of the cells in the cluster to the wireless communication unit to report measurements of broadcast signals from neighbouring cells included in the cluster of cells. From these measurements, and optionally, a predicted likely trajectory over time, a location of the wireless communication unit may be determined using triangulation techniques.

In another embodiment, a comparison of an identity of a wireless communication unit received by the presence cell with a preconfigured set of identities stored in a first memory is made and transmission of the first paging message to a wireless communication unit which has an identity which matches one stored in the first memory is inhibited. In the case of the cluster of presence cells covering a retail store, this measure can be advantageously employed to prevent spoof paging messages from being sent to subscribers who work in the retail store, thereby saving battery drain on their wireless devices which would otherwise respond to the period paging messages which could be sent as frequently as once every 10 to 20 seconds. The first memory may be configured by performing a statistical analysis of how often a particular IMSI is recorded by the presence cell.

In order to record when a wireless communication unit has left the area covered by the cluster of cells, the invention may further comprise generating a second presence message when no first paging message acknowledgement is received from a wireless communication unit wherein the second presence message includes the identity of the wireless communication unit. A deduction of a likely point in time when a particular wireless communication unit leaves the coverage area of the cluster of cells, may be based on a fine time stamp granularity and a direction of travel towards a known exit point.

First and second presence messages may be conveyed to a presence collector for use by retailing or advertising entities, for example. Either presence message may include a timestamp. An identity of the wireless communication message may include at least one of; an IMSI, (International mobile subscriber identity) TMSI, (temporary mobile subscriber identity) LAI (location area identity). An identifier associated with a cell comprising the cluster of cells may be at least one of; a cell ID, its geographical location, an operating frequency, a scrambling code, a CPICH EcNo (Common Pilot Channel Energy-per-chip-to-Noise).

Not all cells in the cluster of cells need have the same first paging message periodicity. In one embodiment, the periodicity of transmission of the first paging messages can be reduced based on detection of static wireless communication units. This has the advantage of reducing battery drain on a wireless communication unit which is likely to remain static for a significant period of time In one embodiment, the periodicity of the first paging message may be reduced if a succession of first paging message acknowledgements have been received at a cell or at two or more adjacent cells for a pre-set length of time.

In another example, an identifier of the first cell in the cluster of cells is compared with a known identifier stored in a second memory and if the identifiers match, the periodicity of transmission of the first paging messages is reduced. This situation could arise if a subscriber moved to an area of a shopping mall or retail store, for example, where a cafeteria was located. If it is not known which cell(s) in the cluster cover the cafeteria (or other particular location), by detecting wireless communication units which linger in one cell or several adjacent cells, this can be deduced. As an example, this information can be deduced by statistic observations across multiple wireless communications units over multiple days. This information can be used to reduce the spoof paging periodicity to wireless communication units which move into such identified cells. Once the cells have been identified this way, their identities can be stored.

Each cell in the cluster of cells may have a Neighbour cell list. As is known, these are used by wireless communication units to assist in cell discovery and cell reselection. These lists are broadcast by base-station transmitters (equally in macrocells and presence cells). Each cell in the cluster of cells may be equipped with a network listen receiver device that can automatically discover surrounding cells and build Neighbour cell lists.

In an alternative arrangement, the cluster of small cells may be connected with a core network, via an access controller such as a HNB-GW for example, and be able to handle data traffic and calls in cases where a user equipment needs to make and receive genuine calls. In this alternative arrangement, the presence cell is not required and a wireless communication unit entering the area covered by the cluster may register with and be accepted by one of the cells in the cluster.

Hence, in accordance with a third aspect of the invention, there is provided a method for providing a location presence service in a cellular communication system comprising a cluster of small cells supporting communications between a wireless communication unit and a core network through an access controller having an area code associated therewith which is different from an area code associated with a neighbouring macrocell, the method comprising: receiving, at a first cell included in the cluster of small cells, from a wireless communication unit, a registration request and an identity of the wireless communication unit; notifying a presence controller of the identity of the wireless communication unit; generating in the presence controller a first paging message containing an identity of the wireless communication unit, transmitting, periodically, in each cell included in the cluster of cells, the first paging message, receiving from the wireless communication at a first cell included in the cluster of cells, a first paging message acknowledgement; and in response, at the presence controller, generating a first presence message wherein the first presence message includes an identity of the wireless communication unit and an estimated location of the wireless communication unit.

In accordance with a fourth aspect of the invention there is provided apparatus for providing a location presence service in a cellular communication system comprising a cluster of small cells supporting communications between a wireless communication unit and a core network through an access controller having an area code associated therewith which is different from an area code associated with a neighbouring macrocell, the apparatus comprising; a presence controller arranged to receive an identity of a wireless communication unit requesting registration with one of the cluster of small cells; to generate a first paging message containing an identity of the wireless communication unit, to send the first paging message to each cell in the cluster of small cells for broadcasting periodically, to receive via a first cell included in the cluster of small cells, a first paging message acknowledgement sent by the wireless communication unit; and in response, to generate a first presence message which includes an identity of the wireless communication unit and an estimated location of the wireless communication unit.

In accordance with a fifth aspect of the invention there is provided a tangible computer program product having an executable computer program code stored thereon for execution by a processor to perform methods in accordance with the first and third aspects. The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory These and other aspects of the invention will be apparent from and elucidated with reference to the embodiments described hereinafter.

Functional elements of the access point may be implemented in one or more integrated circuit devices.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The inventive concept finds particular applicability in a cellular communication system that supports a number of overlapping communication coverage areas, for example a communication system that comprises a combination of small cells and macro cells. Further, the inventive concept finds applicability in a cellular communication system comprising more than one Radio Access Technology.

Those skilled in the art will recognize and appreciate that the specifics of the examples described are merely illustrative of some embodiments and that the teachings set forth herein are applicable in a variety of alternative settings.

Figure 1:
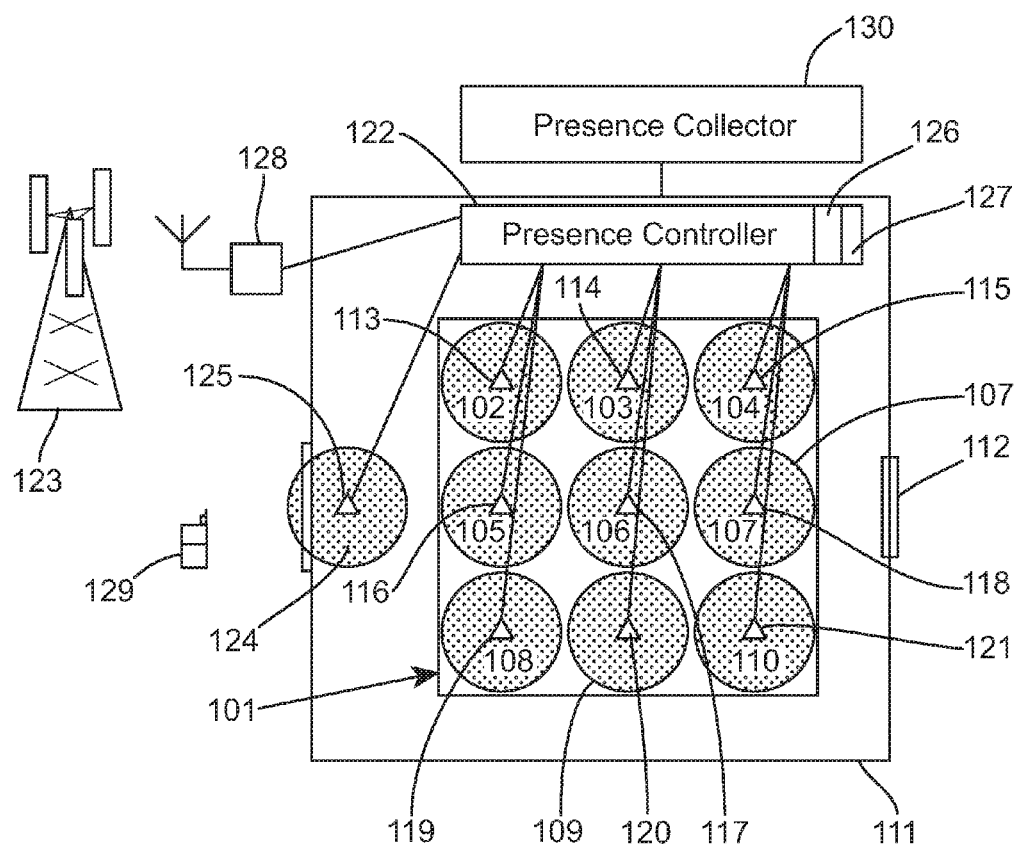
FIG. 1 is a simplified block diagram of a location presence service arrangement in a cellular communications system in accordance with a first embodiment of the invention.

Referring now to FIG. 1, a cluster 101 of nine small cells 102-110 are arranged in a 3 by 3 configuration to cover an area of a retail store 111. One cell 107 of the cluster of cells is closest to an exit 112 of the retail store 111. A further one cell 109 of the cluster of cells covers an area in which a cafeteria is located. Each cell 102-110 in the cluster of cells 101 is served by a respective access point 113-121. Each access point 113-121 is connected to a presence controller 122. The cluster of cells 101 (and therefore every cell 102-110 in the cluster) has a location area code (LAC) assigned to it which is the same location area code as that of a neighbouring macrocell served by a base station 123. The coverage area of the macrocell includes the retail store 111. The access points 113-121 employ standard small cell (or femtocell) technology and each cell in the cluster is assigned a frequency and a scrambling code that allows a user equipment, which is capable of accessing a core network via the macrocell's base station 123, to reselect a cell in the cluster. Also the cells in the cluster 101 are assigned SinterSearch/SintraSearch and QOffset parameters such that the cells appear more attractive to a user equipment than the macrocell. Each cell in the cluster 101 is pre-provisioned with neighbour cell lists to aid cell re-selection by user equipment. In particular, the cell 107 closest to the exit of the retail store 112 has a neighbour cell list which is pre-provisioned with the macrocell frequency and scrambling code parameters. This measure permits a user equipment to reselect the macrocell on exiting the retail store and hence leaving the coverage area of the cell cluster 101. Each cell in the cluster of cells 101 has a different scrambling code from any other cell in the cluster and also has a unique cell identifier. A cell identifier can be a cell ID or another identifier which is associated with its geographical location. The relative locations of each cell in the cluster of cells is known to the presence controller 122. Each cell in the cluster of cells 101 is distinguishable from other cells in the cluster to a user equipment by virtue of its unique scrambling code.

In one embodiment, one or more of the access points 113-121 is provided with a network listen device (not shown) for listening to neighbour cell broadcasts and thereby enabling neighbour cell lists to be configured in the access points 113-121. Network listen devices permit detection and decoding of transmissions from surrounding macrocells, for example. The network listen devices can also be used to determine that an access point has failed if no transmissions can be detected from a particular cell. These network listen measurements can also be used to determine which cells (and how many) are in another cell's neighbour cell list and in which order. This information can be useful in cell planning because there are known to be practical restrictions on how many cells a user equipment will monitor in its limited neighbour cell list. The measurements performed by the network listen devices of the relative signal strengths of transmissions from cells in the cluster of cells can be sent to the presence controller 122 which can compute, using these measurements, an approximate location and relative position of each cell (and its associated access point) in the cluster. This information can assist in the deployment and management of the cell cluster 101. Network listen-based measurements can also be used, in a cell planning exercise, to arrange frequency and scrambling code re-use for the cells comprising the cluster 101 within the same retail store for those cells which are separated by enough distance so that they do not interfere with each other. Additionally, algorithms based on network listen results from each access point 113-121 to another other can allow an automatic power setting for each cell 102-110 in the cluster to provide the minimum level of transmission such that a user equipment is likely to select it as its serving cell, whilst ensuring that a user equipment can be tracked down to approximately 5 meter accuracy. The access points 113-121 may need to be tuned during the day as macrocell breathing takes place and in order to reduce co-channel interference between the cells in the cluster and neighbouring macrocells.

An additional small cell (or "presence" cell) 124 is located at an entrance to the retail store 111. (If the retail store has more than one entrance, then a presence cell can be located at each entrance). The presence cell 124 has assigned to it a location area code (LAC) which is different from the location area code of the macrocell served by the base station 123 (and that of the cluster of cells 101). The presence cell 124 is served by an access point 125 which is connected to the presence controller 122 and which can employ conventional small cell (femtocell) technology. It will be noted that none of the access points 113-121, 125 serving the small cells 102-110, 124 respectively has a connection to any core network. Optionally, the LAC of the presence cell 124 is changed periodically and this is done under the control of the presence controller 122. However, the LAC of the presence cell 124 is always different from that of the neighbouring macrocell (served by the base station 123).

A first memory 126 which can be accessed by the presence controller 122 contains a list of the IMSI's of user equipments which belong to employees who work in the retail store 111. A second memory 127, which is also accessible by the presence controller 122, contains an identifier of the cell 109 in the cluster 101.

A receiver 128 is connected to the presence controller 122 and arranged to receive paging messages intended for user equipments such as the user equipment 129 illustrated FIG. 1 and broadcast by the macrocell' base station 123. The receiver 128 may be located on a rooftop of the retail store 111, for example. The user equipment 129 has an international mobile subscriber identity (IMSI).

Figure 2:
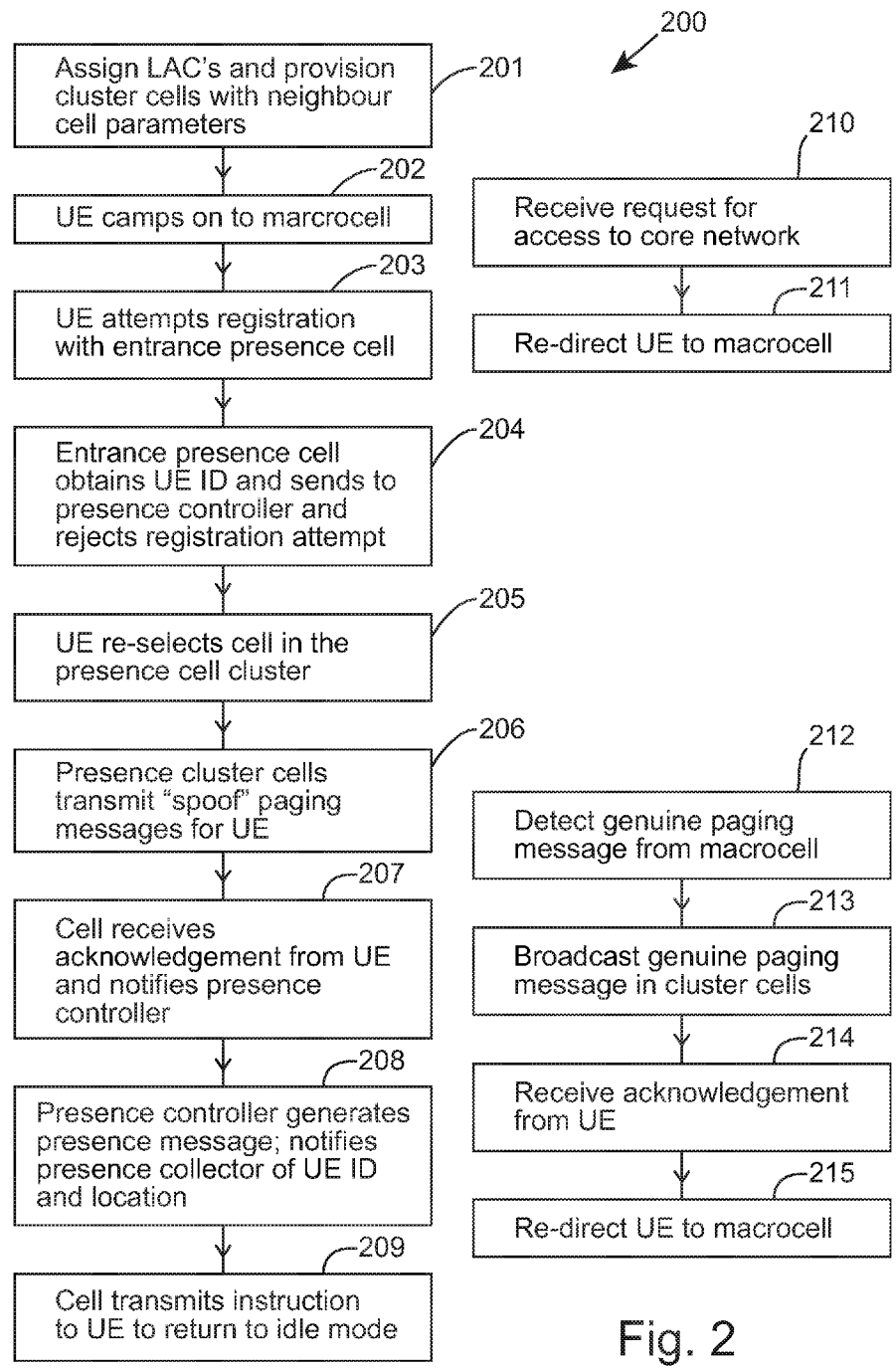
FIG. 2 is a simplified flowchart illustrating operation of the arrangement of FIG. 1.

A presence collector 130 is connected to the presence controller 122 and receives presence messages which have been generated by the presence controller 122. The presence collector 130 may be accessed by an advertising or retail entity which desires to track movement through the retail store 111 of a particular subscriber (eg. the user of the user equipment 129). A method 200 of operation of the location presence service arrangement of FIG. 1 will now be described with reference to FIG. 2.

At 201, a location area code which is the same as that of the neighbouring macrocell is assigned to each cell 102-110 in the cluster of cells 101. A location area code which is different from that of the neighbouring macrocell is assigned to the presence cell 124 which is situated at the entrance to the retail store 111. Each cell comprising the cluster 101 is provided with a neighbour cell list and with its own operating parameters which include a frequency and scrambling code. The presence cell 124 is also provided with appropriate operating parameters.

The user equipment 129 is initially outside the retail store and within the coverage area of the macrocell. At 202, the user equipment "camps on" to the macrocell using standard techniques. A TMSI (temporary mobile subscriber identity) is assigned to the user equipment 129 by the core network and notified to the user equipment 129 via the macrocell base station 123. The macrocell may also broadcast to the user equipment 129 a neighbour cell list which includes the small cells 102-110 comprising the cluster 101. This neighbour cell list can be utilised by the user equipment as a cell reselection list and can include the scrambling codes which have been allocated to each cell in the cluster and that the user equipment could search for.

The user equipment 129 now moves towards the retail store and arrives at the entrance. The user equipment 129 is now within the coverage area of the presence cell 124 and detects that this cell has a different LAC from the cell that it is already camped on to. In accordance with standard procedures, this difference in LACs prompts the UE 129 to attempt registration with the presence cell 124 by performing a Location Update.

Hence, at 203, the user equipment 129 sends a Registration Request in the form of a Location Update to the presence cell 124. The Registration Request includes the TMSI of the user equipment 129 as allocated by the core network. On receiving the Registration Request the presence cell 124 responds, in accordance with known procedures, by sending an Identity Request to the user equipment 129. The user equipment 129 responds by sending its IMSI and an IMEI (international mobile equipment identity) (at 204). Hence, the presence cell 124 now knows the TMSI, the IMSI and a LAI (location area identity) of the user equipment 129.

The access point 125 serving the presence cell 124 sends these identifiers to the presence controller 122 which logs this information. The presence cell 124 rejects the Location Update request and the user equipment 129 reverts to the macrocell, retaining the TMSI which was initially assigned to it by the core network. The presence cell 124 can carry out these instructions using standard techniques. As the user equipment 129 has been rejected from the presence cell having a particular LAC, the user equipment is likely to store this LAC in its "forbidden LAI" list. Therefore, in order to permit the same user equipment 129 to request registration once again on another occasion, the LAC of the presence cell 124 is periodically changed.

On receiving the IMSI of the user equipment 129, the presence controller 122 sends an alert to the presence collector 130 notifying it that a user equipment having this particular IMSI has just entered the retail store 111. The presence collector (or alternatively, an Operator analytics system (not shown) that receives the data from the presence collector) may search for details about the subscriber who owns the user equipment having that particular IMSI. Also the IMEI of the user equipment and its TAC (which is derived from the IMEI and provides the Manufacturer and Model of the user equipment) may be recorded. Typically, IMEI and IMSI are cryptographically hashed using a one-way hashing algorithm to anonymise the user's identity in order to comply with privacy legislation. This information is useful for statistical marketing purposes.

The user equipment 129 continues to move into the retail store and comes within the coverage range of one of the cells 116 in the cluster. The user equipment 129 detects the signals being broadcast from this particular cell 116 and detects that the cell has the same LAC as the macrocell but due to its relative proximity and QOffset biasing, it appears to have a signal quality and/or strength superior to the signal from the macrocell. So in accordance with standard procedures, at 205 the user equipment performs a reselection process whereby it listens for any paging messages sent by the particular cell 116 in the cluster to which it is closest but does not attempt to register with this cell 116 and stays in an idle mode.

Once the presence controller 122 has received the IMSI of a user equipment, it compares this IMSI with a list in the first memory 126 to see if it belongs to an employee of the retail store 111. This list may be provisioned manually, or alternatively, can be derived automatically by analysis of previous records where the user equipment is detected to remain in the retail store for a considerable period of time, e.g. several hours. If the IMSI does match an entry in the list, then the presence controller 122 takes no further action. On the other hand, if the IMSI is not on the list, then the presence controller 122 generates "spoof" paging messages which contain the TMSI of the user equipment which has entered the retail store 111 and sends these periodically (for example every 10 to 20 seconds) to all the access points 113-121 serving all the cells 102-110 in the cluster 101 for broadcasting (at 206). Thus, all cells in the cluster 101 broadcast periodically the spoof paging messages but only the message transmitted by the cell which the user equipment has selected will be detected by the user equipment.

Hence in this example the paging messages from the cell 116 are detected by the user equipment 129 and in response, in accordance with standard procedures, the user equipment 129 transmits a paging message acknowledgement which is received by the selected cell 116 at 207. Typically, a paged user equipment establishes an RRC connection and sends a paging response message (which includes its TMSI/LAI). In response to this acknowledgement, the selected cell 116 notifies the presence controller that a user equipment has responded to the paging message. The selected cell 116 may also include its identifier in this notification to the presence controller 122 so that the presence controller can be made aware of the approximate location of the user equipment at the time it received the notification. If the selected cell 116 determines that the user equipment is of a type that supports enhanced measurements, then the selected cell transmits a request to the user equipment to report physical layer signal strength measurements of surrounding cluster cells. On receiving these measurements, the presence controller can calculate an enhanced estimate of the location of the user equipment in the retail store using triangulation techniques.

At 208, the presence controller 122 generates a presence message which it sends to the presence collector 130. The presence message typically includes the IMSI of the user equipment which responded to the spoof paging message, a timestamp, and an estimate of the location of the user equipment.

At 209, the selected cell 116 transmits to the user equipment a message for instructing the user equipment 129 to return to an idle mode. Typically this can involve sending an RRC Connection Release message to the user equipment 129.

The timing interval of the periodic paging message should be chosen to allow a user equipment to return to idle mode so that it has time to perform cell reselection as it moves around the retail store 111 and also to provide sufficient granularity of measurements. Once the paging message acknowledgement has been notified to the presence controller 122, the presence controller searches the second memory 127 to determine if the cell which received the paging message is cell 109 where the cafeteria is located. The list of ce0lls in the second memory may be derived automatically by comparing the typical dwell time of users in this cell compared to other cells and if the typical dwell time is sufficiently long then the paging period may be reduced. In this example, this is not the case, and the presence controller continues to periodically send the instruction to each cell in the cluster to page this user equipment with a preset regularity. However, if the user equipment were to move into the cafeteria and reselect cell 109 then after receiving the paging acknowledgement, the presence controller may reduce the periodicity of the spoof paging messages for that particular user equipment to one every two minutes, say, or refrain from sending any spoof paging messages for that particular user equipment until a predetermined time had elapsed. The presence controller 122 may also determine, by detecting that a user equipment has remained static for a significant period, that it may reduce the periodicity of the spoof paging message for that particular user equipment. This has the advantage of reducing the impact to the user equipment's battery life.

It may be that in some instances the user equipment 129, after it has moved into the retail store 111 and reselected a cell in the cluster of cells 102-110, requires access to a core network (for example, to make a call). In this case, the user equipment, in accordance with standard procedures transmits a request for core network connection. This request is received, at 210 by the cell within the cluster of cells that the user equipment has reselected. The access point, which serves the particular reselected cell, can determine from the user equipment that a call is requested and the reselected cell transmits a re-direction instruction to the user equipment. Each access point serving the cells in the cluster can determine, when an RRC Connection Request message is received from a user equipment, whether the user equipment is responding to a spoof paging message or requesting access to a core network (for example to make an originating call). This determination can be made using the "Establishment Cause" contained in the RRC connection request message sent by the user equipment.

The redirection instruction instructs the user equipment to register with the macrocell, (at 211). Thus the presence controller 122 and access point use the standard RRC redirect process to redirect the user equipment to the macrocell. This is made possible by pre-provisioning either the presence controller 122 and/or each access point 113-121 with the appropriate parameters of the macrocell (served by the base station 123 for example).

In some instances, a paging message for a user equipment which is located in the retail store 111 and has reselected one of the cells in the cluster of cells may be broadcast by the macrocell's base station 123. This genuine paging message will not be detected by such a user equipment because it is not currently listening for paging messages from the base station 123 but rather for messages transmitted from the cell in the cluster of cells that it has reselected. The invention provides for such a user equipment to be made aware of genuine paging messages by the provision of the paging receiver 128 (see FIG. 1). At 212, a genuine paging message broadcast by the macrocell is received at the paging receiver 128. The paging receiver can be similar to a user equipment and is pre-provisionied with parameters of the macrocell so that it is capable of detecting the broadcast paging messages. These genuine paging messages are forwarded by the paging receiver 128 to the presence controller 122. A genuine paging message will include the TMSI of the user equipment for which the paging message is intended. Therefore as the presence controller 122 knows, from information received from the presence cell 124, the TMSIs of all the user equipments which have entered the retail store 111, it is be able to filter out those paging messages broadcast by the macrocell which are destined for such user equipments. If a user equipment had selected a cell in the cluster but had failed to be detected by the presence cell on entering the retail store, then so that it may receive genuine paging messages, all the cells in the cluster may re-broadcast all paging messages detected in macrocell broadcasts but prioritise those that are for user equipments which are known to have entered the retail store. So at 213, the presence controller 122 forwards a genuine paging message to each access point 113-121 serving the cluster of cells 102-110 and each access point broadcasts the genuine paging signal. The user equipment responds, using standard messaging, and at 214 the reselected cell receives an acknowledgement from the user equipment. The reselected cell sends a redirect message for redirecting, at 215, the user equipment to the macrocell. This is possible as each access point 113-121 serving the cluster of cells is provisioned with the macrocell parameters such as a frequency and scrambling code and can pass these parameters on to the user equipment to enable it to contact the macrocell. If the user equipment is unable to contact the macrocell (due to poor indoor coverage for example) then in accordance with standard procedures, the macrocell detects this failure to respond and sends any incoming caller to voicemail or plays out a message saying that the user equipment is temporarily unavailable.

In some embodiments, the presence controller 122 is arranged to employ a filtering process so that it will only replay genuine paging messages to those user equipments which have been recently detected to be in the vicinity of the presence cell 124 or to have recently sent spoof paging acknowledgement messages to one of the cells in the cluster of cells 102-110. Such filtering may additionally involve time-based decay (for example some suitable overlap of time such as one hour after the last time a user equipment responded to paging or performed the initial location update with the presence cell 124).

In cases where the retail store is located at a border between multiple LAC regions then more than one paging receiver may be required for listening to multiple macrocells although the location area code used by the cluster of cells would be the primary location area code to listen to.

Once a user equipment stops responding to paging messages (either spoof or genuine) the presence controller assumes that the user equipment has left the retail store 111 and refrains from sending any further spoof paging messages or forwarding any genuine paging message to that particular user equipment. Say that the user equipment exits the retail store through the exit 112 and the last cell in the cluster of cells it reselected was cell 107. Cell 107 is pre-provisioned with the macrocell's parameters and broadcasts these in a neighbour cell list which the user equipment can detect. Thus, as the user equipment moves out of the retail store and out of range of cell 107, it is able to reselect the macrocell. The presence controller 122 records when a user equipment stops responding to paging messages as this information can be useful in order to track the dwell period of a subscriber in the retail store.

Figure 3:
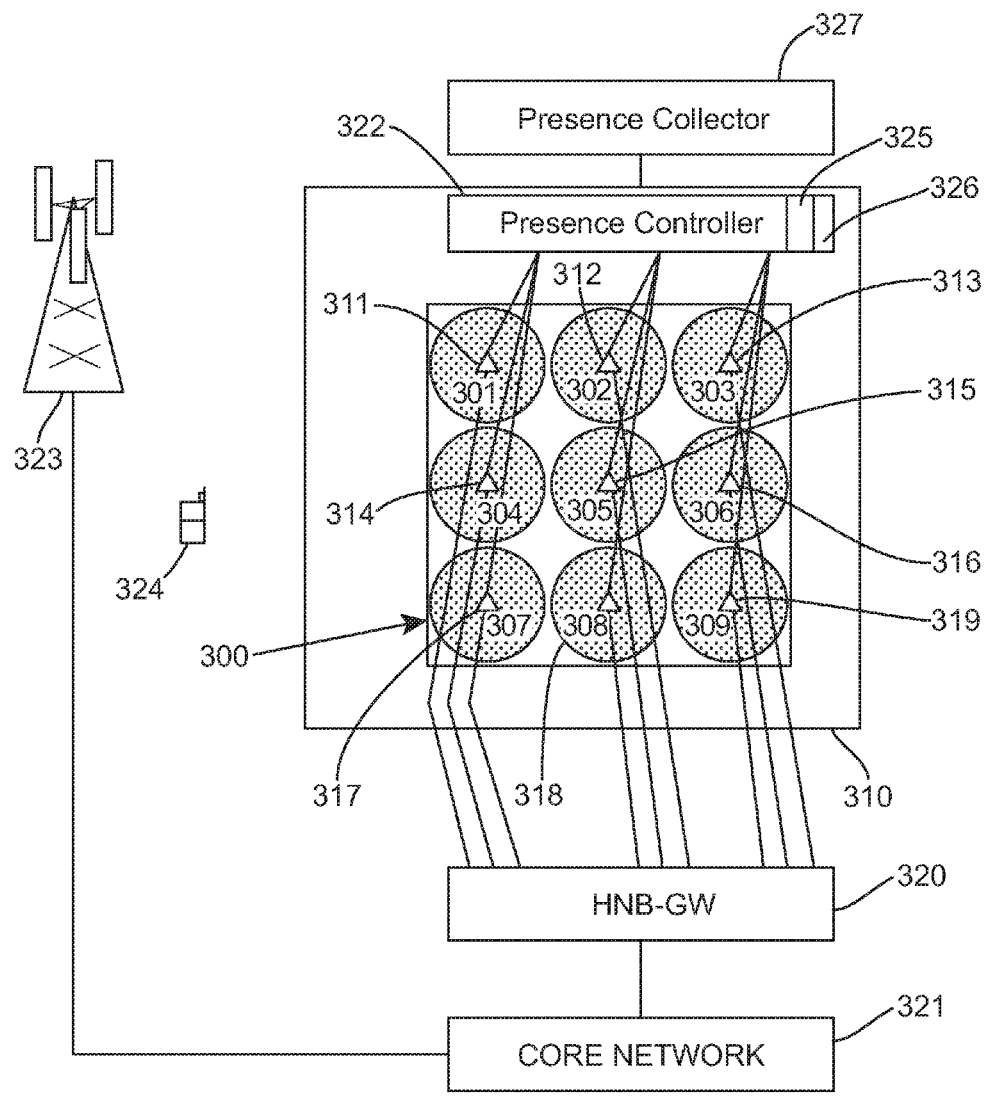
FIG. 3 is a simplified block diagram of a location presence service arrangement in a cellular communications system in accordance with a second embodiment of the invention.
Figure 4:
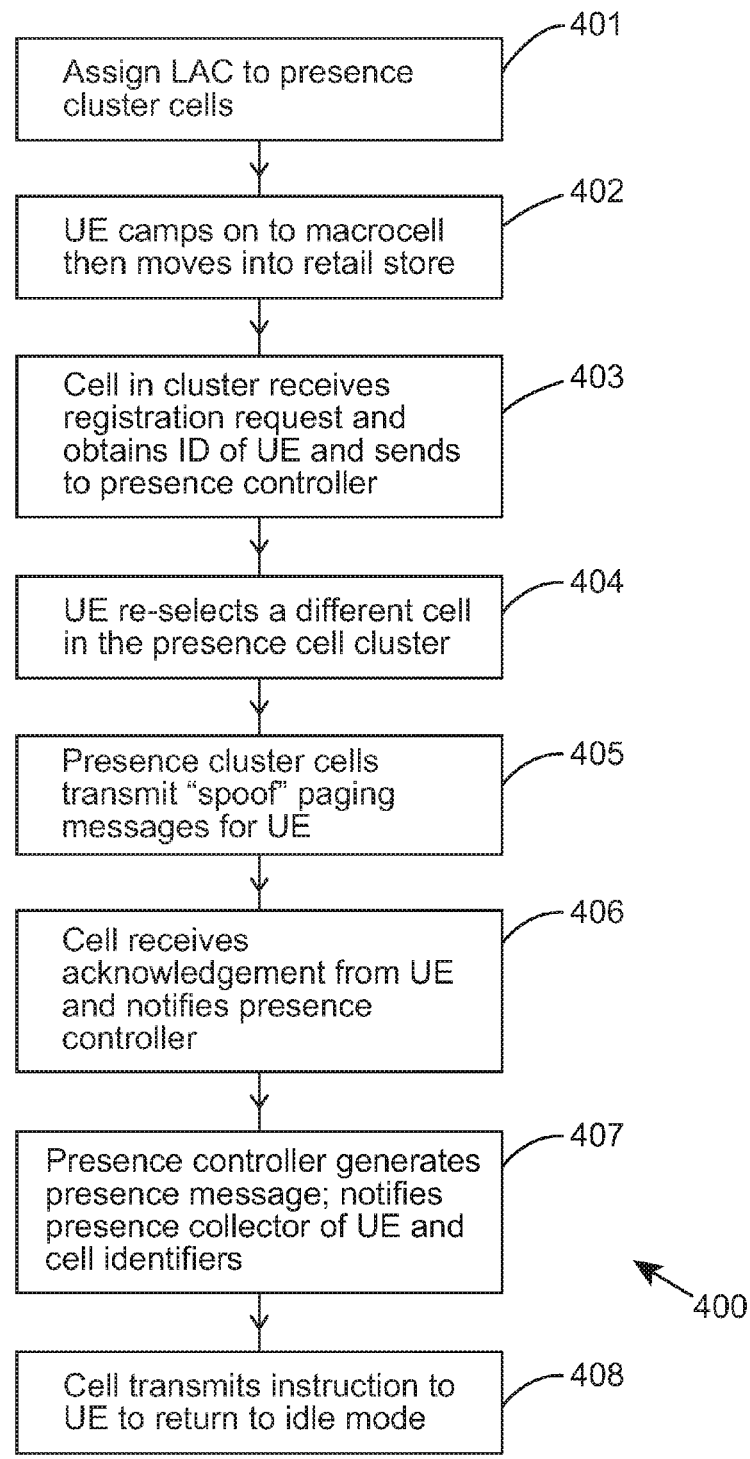
FIG. 4 is a simplified flowchart illustrating operation of the arrangement of FIG. 3

A second embodiment of the invention will now be described with reference to FIG. 3.

A cluster 300 of nine small cells 301-309 are arranged in a 3 by 3 configuration to cover an area of a retail store 310. Each cell 301-309 in the cluster of cells 300 is served by a respective access point 311-319. Each access point 311-319 is connected to a Home Node B Gateway (HNB-GW) 320 which, in turn, is connected to a core network 321. Each access point 311-319 is also connected to a presence controller 322. The cluster of cells 300 has a location area code (LAC) assigned to it which is different from the location area code as that of a neighbouring macrocell served by a base station 323 which is connected with the core network 321 via other network elements (not shown). The coverage area of the macrocell includes the retail store 310. The access points 311-319 employ standard small cell (or femtocell) technology and each cell in the cluster is assigned a frequency and a scrambling code that allows a user equipment, which is capable of accessing the core network via the macrocell's base station 323, to reselect a cell in the cluster. Also the cells in the cluster 300 are assigned Sinter/Sintra and QOffset parameters such that the cells appear more attractive to a user equipment than the macrocell. Each cell in the cluster 300 is pre-provisioned with neighbour cell lists. In particular, a cell closest to an exit of the retail store 310 has a list which is pre-provisioned with the macrocell parameters. This measure permits user equipments to reselect the macrocell on exiting the retail store and hence leaving the coverage area of the cell cluster 300. Each cell in the cluster of cells 300 has a different scrambling code from any other cell in the cluster and also has a unique cell identifier. A cell identifier can be a cell ID or another identifier which is associated with its geographical location. The relative locations of each cell in the cluster of cells is known to the presence controller 322. Each cell in the cluster of cells 300 is distinguishable from other cells in the cluster to a user equipment by virtue of its unique scrambling code.

A user equipment 324 may register with the macrocell supported by the base station 323 in order to gain access to the core network 321 or with any of the cells 300-309 within the cluster of cells 300 depending on whose coverage area it may be in at the time.

A first memory 325 which can be accessed by the presence controller 322 contains a list of the IMSI's of user equipments which belong to employees who work in the retail store 310. A second memory 326, which is also accessible by the presence controller 322, contains an identifier of a cell in the cluster 300 which covers a particular region of the retail store 310 where a user equipment is likely to be static for 10 minutes or more (say at a location coincident with a cafeteria).

A presence collector 327 is connected to the presence controller 322 and receives presence messages which have been generated by the presence controller 322. The presence collector 327 may be managed by an advertising or retail entity which desires to track movement through the retail store 310 of a particular subscriber (eg. the user of the user equipment 324).

Optionally, one or more of the access points 311-319 is provided with a network listen device (not shown) for listening to neighbour cell broadcasts and thereby enabling neighbour cell lists to be configured in the access points. The network listen devices can also be used to determine that an access point has failed if no transmissions can be detected from a particular cell. The measurements performed by the network listen devices of the relative signal strengths of transmissions from cells in the cluster of cells can be sent to the presence controller 322 which can compute, using these measurements, an approximate location and relative position of each cell (and its associated access point) in the cluster. This information can assist in the deployment and management of the cell cluster 300.

A method 400 of operation of the location presence service arrangement of FIG. 3 will now be described with reference to FIG. 3.

At 401, a location area code which is different from that of the neighbouring macrocell is assigned the cluster of cells 300. (Each cell 301-309 in the cluster has the same LAC). Each cell comprising the cluster 101 is provided with a neighbour cell list and with its own operating parameters which include a frequency and scrambling code.

The user equipment 324 is initially outside the retail store 310 and within the coverage area of the macrocell. At 402, the user equipment "camps on" to the macrocell using standard techniques. A TMSI is assigned to the user equipment 324 by the core network 321 and notified to the user equipment 324 via the macrocell base station 323. The macrocell may also give the user equipment 324 a neighbour cell list which includes the small cells 301-309 comprising the cluster 300. This neighbour cell list can be utilised by the user equipment as a cell reselection list and can include the scrambling codes which have been allocated to each cell in the cluster and that the user equipment could search for. The user equipment 324 then moves into the retail store.

The user equipment then moves into the coverage area of one of the cells in the cluster 300, cell 304, say, and detects that this cell has a different LAC from the macrocell that it is already camped on to. In accordance with standard procedures, this difference in LACs prompts the UE 324 to attempt registration with the cell 304 in the cluster by performing a Location Update.

Hence, the user equipment 324 sends a Registration Request to the cell 304 in the cluster 300. The Registration Request includes the TMSI of the user equipment 324. On receiving the Registration Request, at 403, the cell 304 responds, in accordance with known procedures, by sending an Identity Request to the user equipment 324. The user equipment 324 responds by sending its IMSI with a Location Update. Hence, the cell 304 now knows the TMSI, the IMSI and a LAI (location area identity) of the user equipment 324. The access point 314 which serves the cell 304 sends these identifiers to the presence controller 322 which logs this information. The cell 304 can carry out these instructions using standard techniques. The user equipment 324 is now accepted onto the LAC of the cell cluster 300.

On receiving the IMSI of the user equipment 324, the presence controller 122 may send an alert to the presence collector 327 notifying it that a user equipment having this particular IMSI has just entered the retail store 310. The presence collector (or operator analytics system that receives the data from the presence collector) may search for details about the subscriber who owns the user equipment having that particular IMSI. Also the IMEI of the user equipment and its TAC (which is derived from the IMEI provides the Manufacturer and Model of the user equipment) may be recorded. Typically the user identity (IMEI and IMSI) are cryptographically hashed using a one-way hashing algorithm (for example SHA or MD5) to anonymise the user's identity in order to comply with privacy legislation. This information is useful for statistical marketing purposes.

The user equipment 324 continues to move into the retail store and comes within the coverage range of a different one of the cells in the cluster, say cell 302. The user equipment 324 detects the signals being broadcast from this particular cell 302 and detects that the cell has the same LAC but has a signal quality and/or strength superior to the signal from the cell 304 that it had previously registered with. So in accordance with standard procedures, at 404 the user equipment performs a reselection process whereby it listens for any paging messages sent by the particular cell 302 in the cluster to which it is closest but does not attempt to register with this cell 302 and stays in an idle mode.

Once the presence controller 322 has received the IMSI of a user equipment, it compares this IMSI with a list in the first memory 325 to see if it belongs to an employee of the retail store 310. This list may be provisioned manually or can be derived automatically by analysis of previous records where the user equipment is detected for a significant period of time (e.g. several hours). If it does, then the presence controller 322 takes no further action. On the other hand, if the IMSI is not on the list, then the presence controller 322 generates "spoof" paging messages which contain the TMSI of the user equipment which has entered the retail store 310 and sends these periodically (for example every 10 to 20 seconds) to all the access points 311-319 serving all the cells 301-309 in the cluster 300 for broadcasting (at 405). Thus, all cells in the cluster 300 broadcast periodically the spoof paging messages but only the message transmitted by the cell which the user equipment has selected will be detected by the user equipment 324.

Hence in this example the paging messages from the cell 302 are detected by the user equipment 324 and in response, in accordance with standard procedures, the user equipment 324 transmits a paging message acknowledgement which is received by the selected cell 302 (at 406). Typically, a paged user equipment establishes an RRC connection and sends a paging response message (which includes its TMSI/LAI). In response to this acknowledgement, the selected cell 302 notifies the presence controller 322 that a user equipment has responded to the paging message. The selected cell 302 may also include its identifier in this notification to the presence controller 322 so that the presence controller can be made aware of the approximate location of the user equipment at the time it received the notification. If the presence controller determines that the user equipment is of a type that supports enhanced measurements, then the presence controller 322 generates a request, for transmitting by the selected cell 302, for the user equipment to report relative signal strengths of surrounding cluster cells from System Information messages broadcast by the access points 1311-319 serving the cluster 300 of cells. On receiving these relative signal strength measurements, the presence controller 322 can calculate an enhanced estimate of the location of the user equipment in the retail store using triangulation techniques.

At 407, the presence controller 322 generates a presence message which it sends to the presence collector 327. The presence message typically includes the IMSI of the user equipment which responded to the spoof paging message, a timestamp, and an estimate of the location of the user equipment.

At 408, the presence controller 322 generates a message which it sends to the selected cell 302 for transmission to the user equipment for instructing the user equipment to return to an idle mode. Typically this can involve sending an RRC Connection Release message to the user equipment 324.

The timing interval of the periodic spoof paging message should be chosen to allow a user equipment to return to idle mode so that it has time to perform cell reselection as it moves around the retail store 300 and also to provide sufficient granularity of measurements. Once the paging message acknowledgement has been notified to the presence controller 322, the presence controller searches the second memory 326 to determine if the cell which received the paging message is a cell where the user equipment is likely to linger. The list of cells in the second memory may be derived automatically by observing the typical dwell time of users in a cell and if the typical dwell time is sufficiently long then the paging period may be reduced. If this is not the case, the presence controller continues to periodically send the instruction to each cell in the cluster to page this user equipment with a preset regularity. However, if the user equipment were to move into an area where it is expected to linger (eg. a cafeteria), then after receiving the paging acknowledgement, the presence controller would reduce the periodicity of the spoof paging messages for that particular user equipment to one every two minutes, say, or refrain from sending any spoof paging messages for that particular user equipment until a predetermined time had elapsed. The presence controller 322 may also determine, by detecting that the location of a user equipment has remained static for a significant period, that it may reduce the periodicity of the spoof paging message for that particular user equipment. This has the advantage of reducing the impact to the user equipment battery life.

As, in this second embodiment, the cluster of small cells 300 is connected with the core network 321, the cluster can handle traffic and calls in cases where a user equipment needs to make and receive genuine calls. This can be done In accordance with standard procedures. As the presence controller 322 controls the transmission of the spoof paging messages and receives the subsequent acknowledgements from a user equipment, it is capable of discriminating between a paging acknowledgement message which is sent in response to a spoof paging message and one which is sent in response to a genuine paging message which came from the core network.

The signal processing functionality of the embodiments of the invention functions performed by the presence controller 122, 322 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A method for providing a location presence service in a cellular communication system comprising a plurality of neighbouring small cells including a presence cell and a cluster of cells, the method comprising:
    assigning an area code to the presence cell which is different from an area code assigned to a neighbouring macrocell;
    assigning an area code to each cell in the cluster of cells which is the same as the area code of the macrocell;
    receiving at the presence cell, from a wireless communication unit, a registration request and an identity of the wireless communication unit;
    rejecting the registration request;
    transmitting periodically, in each cell included in the cluster of cells, a first paging message containing an identity of the wireless communication unit;
    receiving from the wireless communication unit at a first cell included in the cluster of cells, a first paging message acknowledgement; and
    in response, generating a first presence message wherein the first presence message includes an identity of the wireless communication unit and an estimated location of the wireless communication unit.

2. A method according to claim 1, further comprising: subsequent to receiving, at the first cell, the first paging message acknowledgement, transmitting an instruction to the wireless communication unit to return to an idle mode.

3. A method according to claim 2, wherein the instruction to the wireless communication unit to return to an idle mode comprises a radio resource control, RRC, connection release.

4. A method according to claim 1, further comprising: periodically changing the area code of the presence cell.

5. A method according to claim 1, further comprising: at a cell in the cluster of cells, transmitting an instruction to the wireless communication unit to report measurements of broadcast signals from neighbouring cells included in the cluster of cells.

6. A method according to claim 5, further comprising: determining a location of the wireless communication unit based on the reported measurements.

7. A method according to claim 1, further comprising: generating a second presence message when no first paging message acknowledgement is received from a wireless communication unit wherein the second presence message includes the identity of the wireless communication unit.

8. A method according to claim 7, wherein the second presence message includes a timestamp.

9. A method according to claim 1, further comprising: comparing an identifier of the first cell in the cluster of cells with a known identifier stored in a second memory and if the identifiers match, reducing the periodicity of transmission of the first paging messages.

10. A method according to claim 1, further comprising reducing the periodicity of transmission of the first paging messages if a succession of first paging message acknowledgements have been received at one or more cells in the cluster of cells or at the first cell or at the first cell and one or more cells adjacent to the first cell for a pre-set length of time.

11. A method according to claim 1, further comprising; configuring neighbour cell lists in each cell comprising the cluster of cells using network listen devices associated with each cell in said cluster of cells.

12. A method according to claim 1, wherein the area code is a location area code, LAC.

13. A method according to claim 1, wherein the identity of the wireless communication unit includes at least one of; an International mobile subscriber identity, IMSI, a Temporary International mobile subscriber identity, TMSI, a location area identity, LAI, and/or the identifier associated with the first cell is at least one of; a geographical location, a cell identifier, a frequency, a scrambling code, a CPICH, a Common Pilot Channel Energy-per-chip-to-Noise EcNo.

14. A method according to claim 1, wherein the first presence message includes a timestamp.

15. An apparatus for providing a location presence service in a cellular communication system comprising a plurality of neighbouring small cells including a presence cell and a cluster of cells wherein the presence cell has an area code which is different from that of a neighbouring macrocell and the cluster of cells has an area code the same as that of the macrocell, the apparatus comprising:
    a presence controller: arranged to receive from the presence cell an identity of a wireless communication unit requesting registration with the presence cell, to generate a first paging message containing an identity of the wireless communication unit and send the first paging message to each cell in the cluster of cells for broadcasting periodically, to receive via a first cell included in the cluster of cells, a first paging message acknowledgement sent by the wireless communication unit; and in response, to generate a first presence message wherein the first presence message includes the identity of the wireless communication unit and an estimated location of the wireless communication unit.

16. An apparatus according to claim 15, wherein the apparatus is arranged, on receipt of the first paging acknowledgement to generate an instruction for sending to the wireless communication unit to return to an idle mode.

17. An apparatus according to claim 15, and including a first memory for storing a first list of wireless communication unit identities and wherein the presence controller is arranged to inhibit generation of the first paging message for a wireless communication unit which has an identity which matches one included in the first list.

18. An apparatus according to claim 15, wherein the presence controller is arranged to generate a second presence message when no first paging message acknowledgement is received from a wireless communication unit wherein the second presence message includes the identity of the wireless communication unit.

19. An apparatus according to claim 15, and including a second memory for storing an identifier of a cell included in the cluster of cells and wherein the presence controller is arranged to compare the identifier of the first cell with the known identifier and if there is a match, to reduce the periodicity of transmission of the first paging messages.

20. A tangible computer program product having an executable computer program code stored thereon for execution by a processor to perform a method comprising the steps of:

assigning an area code to the presence cell which is different from an area code assigned to a neighbouring macrocell;
assigning an area code to each cell in the cluster of cells which is the same as the area code of the macrocell;
receiving at the presence cell, from a wireless communication unit, a registration request and an identity of the wireless communication unit;
rejecting the registration request;
transmitting periodically, in each cell included in the cluster of cells, a first paging message containing an identity of the wireless communication unit;
receiving from the wireless communication unit at a first cell included in the cluster of cells, a first paging message acknowledgement; and
in response, generating a first presence message wherein the first presence message includes an identity of the wireless communication unit and an estimated location of the wireless communication unit.

* * * * *